(12) United States Patent
Buitron et al.

(10) Patent No.: US 7,789,615 B2
(45) Date of Patent: *Sep. 7, 2010

(54) APPARATUS FOR COMBINING OR SEPARATING DISK PAIRS SIMULTANEOUSLY

(75) Inventors: Gerardo Buitron, San Jose, CA (US); Thuan Luu, San Jose, CA (US); Barry Okamoto, San Ramon, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/114,800

(22) Filed: May 4, 2008

(65) Prior Publication Data

US 2008/0206024 A1    Aug. 28, 2008

Related U.S. Application Data

(62) Division of application No. 10/434,551, filed on May 9, 2003, now Pat. No. 7,367,773.

(51) Int. Cl.
*B65G 65/00* (2006.01)
(52) U.S. Cl. .................... 414/811; 414/404; 451/41
(58) Field of Classification Search ............ 414/226.01, 414/416.04, 404, 806, 811; 451/41
See application file for complete search history.

(56) References Cited

U.S. PATENT DOCUMENTS

| | | | |
|---|---|---|---|
| 4,573,851 A | 3/1986 | Butler | |
| 4,669,612 A | 6/1987 | Mortensen | |
| 4,676,008 A | 6/1987 | Armstrong | |
| 4,694,778 A | 9/1987 | Learn et al. | |
| 4,695,217 A | 9/1987 | Lau | |
| 4,724,963 A | 2/1988 | Mortensen | |
| 4,819,579 A | 4/1989 | Jenkins | |
| 4,840,530 A | 6/1989 | Nguyen | |
| 4,856,957 A | 8/1989 | Lau et al. | |
| 4,947,624 A | 8/1990 | Cones, Sr. et al. | |
| 4,947,784 A | 8/1990 | Nishi | |
| 4,949,848 A | 8/1990 | Kos | |
| 4,958,982 A | 9/1990 | Champet et al. | |
| 4,981,222 A | 1/1991 | Lee | |
| 4,987,407 A | 1/1991 | Lee | |

(Continued)

FOREIGN PATENT DOCUMENTS

EP    766704    4/1997

OTHER PUBLICATIONS

US 5,762,201, 06/1998, Whalen (withdrawn)

*Primary Examiner*—Charles A Fox
(74) *Attorney, Agent, or Firm*—McCarthy Law Group

(57) ABSTRACT

A manufacturing apparatus and associated method for handling disks disposed in merged pairs in a carrier is provided, wherein spacings between adjacent pairs of the disks are greater than spacings between disks forming each pair. The apparatus includes a first disk contacting surface defining a first cavity that is sized to receivingly engage a selected one of the pairs of disks. A second disk contacting surface defines second and third cavities that are sized to receivingly engage individual disks of the selected pair of disks, wherein disks that are operably engaged in the cavities are spatially separated more adjacent the second disk contacting surface than at the first disk contacting surface.

16 Claims, 19 Drawing Sheets

U.S. PATENT DOCUMENTS

| | | |
|---|---|---|
| 5,007,788 A | 4/1991 | Asano et al. |
| 5,111,936 A | 5/1992 | Kos |
| 5,125,784 A | 6/1992 | Asano |
| 5,131,800 A * | 7/1992 | Akagawa ............... 414/416.02 |
| 5,188,499 A | 2/1993 | Tarng et al. |
| 5,314,107 A | 5/1994 | D'Aragona et al. |
| 5,348,151 A | 9/1994 | Dressen |
| 5,430,992 A | 7/1995 | Olson |
| 5,476,176 A | 12/1995 | Gregerson et al. |
| 5,486,134 A | 1/1996 | Jones et al. |
| 5,620,295 A | 4/1997 | Nishi |
| 5,780,127 A | 7/1998 | Mikkelsen |
| 5,820,449 A | 10/1998 | Clover |
| 5,906,469 A | 5/1999 | Oka et al. |
| 5,976,255 A | 11/1999 | Takaki et al. |
| 6,033,522 A | 3/2000 | Iwata et al. |
| 6,107,599 A | 8/2000 | Baumgart et al. |
| 6,345,947 B1 | 2/2002 | Egashira |
| 6,354,794 B2 | 3/2002 | Sato et al. |
| 6,368,040 B1 | 4/2002 | Yamasaki et al. |
| 6,457,929 B2 | 10/2002 | Sato et al. |
| 6,582,279 B1 | 6/2003 | Fox et al. |
| 6,612,801 B1 | 9/2003 | Koguchi |
| 6,626,744 B1 | 9/2003 | White et al. |
| 7,052,739 B2 * | 5/2006 | Buitron et al. ............ 427/430.1 |
| 7,083,376 B2 * | 8/2006 | Crofton et al. ............... 414/811 |
| 7,168,153 B2 * | 1/2007 | Buitron et al. ........... 29/603.04 |
| 2003/0208899 A1 | 11/2003 | Grow et al. |
| 2003/0209389 A1 | 11/2003 | Buitron et al. |
| 2003/0209421 A1 | 11/2003 | Buitron et al. |
| 2003/0210498 A1 | 11/2003 | Kim et al. |
| 2003/0211275 A1 | 11/2003 | Buitron et al. |
| 2003/0211361 A1 | 11/2003 | Kim et al. |
| 2004/0013011 A1 | 1/2004 | Valeri |
| 2004/0016214 A1 | 1/2004 | Buitron |
| 2004/0068862 A1 | 4/2004 | Buitron et al. |
| 2004/0069662 A1 | 4/2004 | Buitron et al. |
| 2004/0070092 A1 | 4/2004 | Buitron et al. |
| 2004/0070859 A1 | 4/2004 | Crofton et al. |
| 2004/0071535 A1 | 4/2004 | Crofton et al. |

* cited by examiner

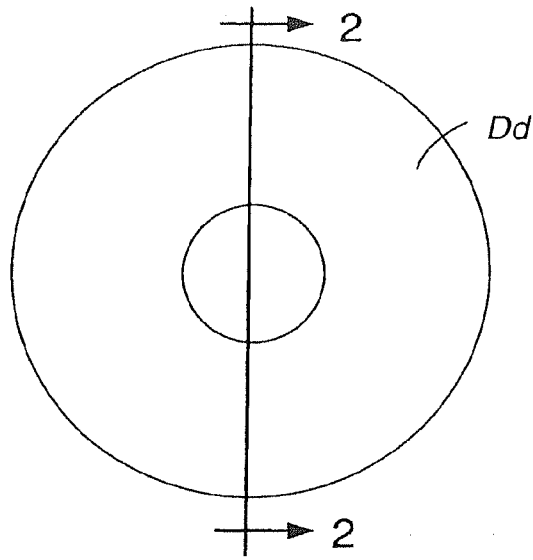
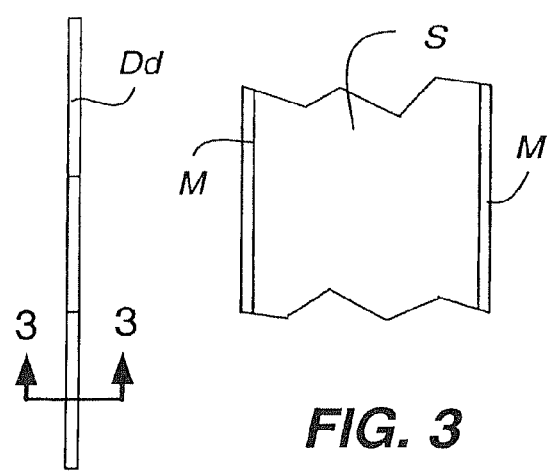
FIG. 1
FIG. 2
FIG. 3
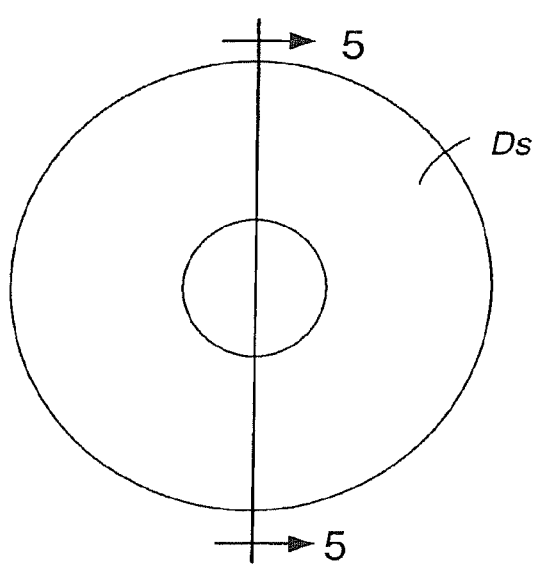
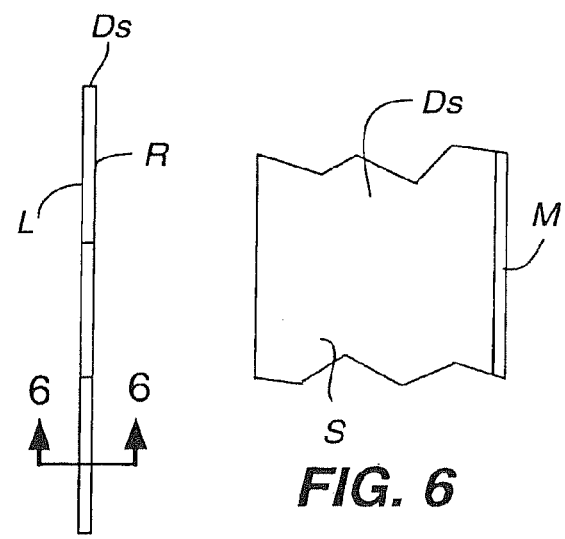
FIG. 4
FIG. 5
FIG. 6

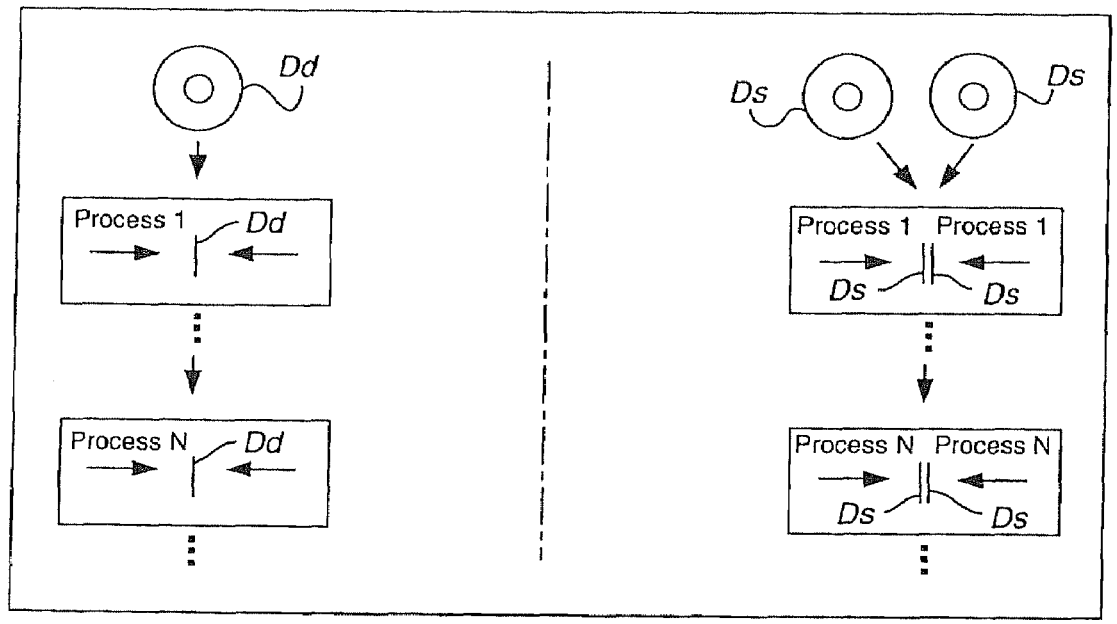
FIG. 7
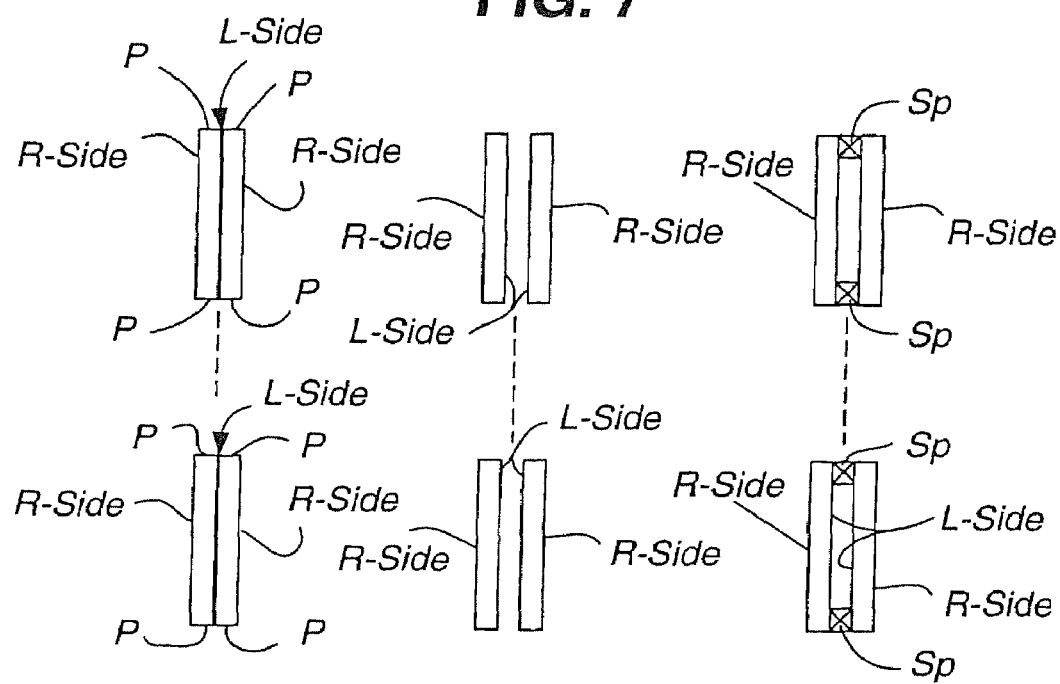
FIG. 8  FIG. 9  FIG. 10

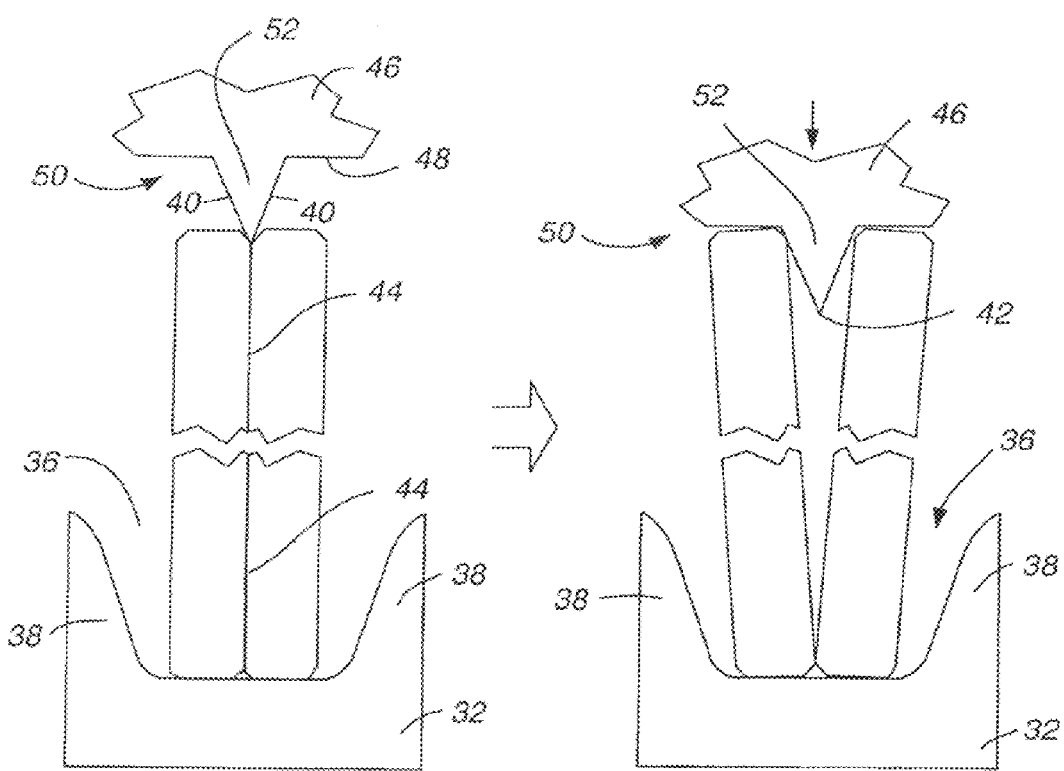

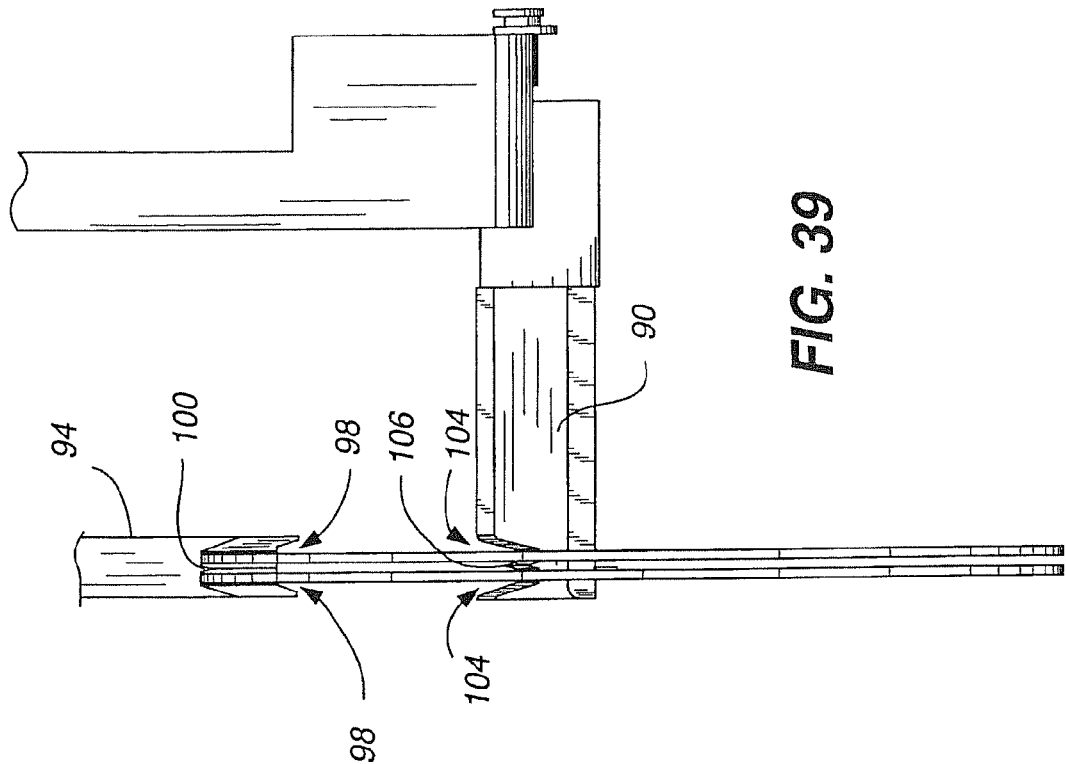
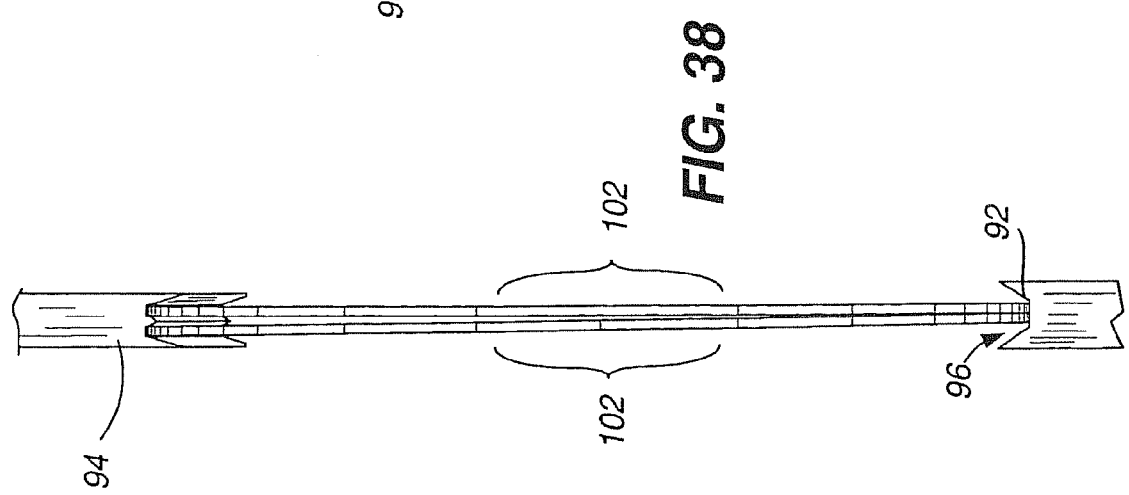

APPARATUS FOR COMBINING OR SEPARATING DISK PAIRS SIMULTANEOUSLY

CROSS REFERENCE TO RELATED APPLICATION

This is a divisional application of U.S. patent application Ser. No. 10/434,551 that claims priority from U.S. Provisional Patent Application Ser. No. 60/379,199 filed May 9, 2002, which is incorporated by reference herein in its entirety.

The subject matter of the present application is related to the following applications, each of which has a filing date of May 9, 2003: Publication No. 2003-0211361, now U.S. Pat. No. 7,083,871 Publication No. US-2003-0208899, now U.S. Pat. No. 7,165,308; Publication No. US-2003-0210498, now U.S. Pat. No. 7,180,709; Publication No. US-2004-0016214, still pending; Publication No. 2003-0211275, now U.S. Pat. No. 7,322,098 Publication No. US-2003-0209421, still pending; Publication No. 200400013011, now U.S. Pat. No. 7,027,246; Publication No. 2004-0070092, now U.S. Pat. No. 7,083,502 Publication No. US-2004-0069662, still pending; U.S. Pat. No. 7,083,376 Publication No. US-2004-0070859, still pending; Publication No. 2004-0068862, now U.S. Pat. No. 7,168,153; and Publication No. 2003-0209389, now U.S. Pat. No. 7,052,739 Each of these applications is incorporated by reference in its entirety as if stated herein. All of these applications are commonly owned by the Assignee.

FIELD OF THE INVENTION

The present embodiments relate to various apparatus and methods for separating or combining a plurality of pairs of single-sided hard memory recording disks. While the apparatus and method can be employed at any needed point within the overall manufacturing process, two particularly suitable uses are at the beginning of the manufacturing process when it is desirable to arrange substrate disks in pairs in cassettes and at the end of the manufacturing process when it is desirable to separate oppositely facing single-sided finished disks positioned in pairs in a single cassette and re-arrange them into two cassettes, with the active surface of each disk in each cassette facing the same direction.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active, or in other words, functional, from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active, or functional, for memory storage purposes. These disks are referred as double-sided disks. Double-sided disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided disks used in personal computers have much greater storage capacity than most consumers require during the useful life of the computer. Consumers thus are forced to pay substantial amounts for excess storage capacity and the components to access that excess storage capacity. This has caused some disk drive manufacturers, in some current applications, to manufacture and sell disk drives which utilize only one side of a double-sided disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk $D_s$ has only one functional memory surface with active recording materials M. (See, FIGS. 4-6.) It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present embodiments achieve advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 7 shows a side-by-side schematic representation of the processing of one double-sided disk $D_d$, depicted on the left side of FIG. 7, versus the simultaneous processing of two single-sided disks $D_s$, depicted on the right side of FIG. 7. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 9, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 8. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 10. The left side surface is referred to as the "A" side and the right side surface is referred to as the "B" side. Both the A and B sides are subjected to processing, including the addition of active or magnetic materials. In contrast, with reference to FIGS. 8 and 9, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

The present embodiments are generally directed to methods and apparatus for combining or separating disk pairs simultaneously.

In some embodiments a method of manufacturing disks is provided, including steps of: processing a plurality of merged pairs of the disks in a carrier, wherein spacings between adjacent pairs of the disks are greater than spacings between disks forming each pair; contactingly engaging the disks in groupings of the pairs at a first common radial position and in groupings of individual disks at a second common radial position, making the spacings between disks forming each pair greater at the second common radial position than at the first common radial position; aligning a mandrel with the disks; and supporting the disks on the mandrel in an even spacing by withdrawing the contactingly engaging step.

In some embodiments a manufacturing apparatus for handling disks disposed in merged pairs in a carrier is provided, wherein spacings between adjacent pairs of the disks are greater than spacings between disks forming each pair. The apparatus includes a first disk contacting surface defining a first cavity that is sized to receivingly engage a selected one of the pairs of disks. A second disk contacting surface defines second and third cavities that are sized to receivingly engage individual disks of the selected pair of disks, wherein disks that are operably engaged in the cavities are spatially separated more adjacent the second disk contacting surface than at the first disk contacting surface.

BRIEF DESCRIPTION OF THE DRAWINGS

FIG. 1 is a front elevation of a double-sided process disk.

FIG. 2 is a cross-section taken along line 2-2 of FIG. 1.

FIG. 3 is a partial cross-section taken along line 3-3 of FIG. 2.

FIG. 4 is a front elevation view of a single-sided disk.

FIG. 5 is a cross-section taken along line 5-5 of FIG. 4.

FIG. 6 is a partial cross-section taken along line 6-6 of FIG. 5.

FIG. 7 is a schematic of a process for manufacturing double-sided disks, on the left, and a schematic of a process for manufacturing single-sided disks, on the right.

FIG. 8 is a cross-section of a pair of disks in concentric contact merge.

FIG. 9 is a cross-section of a pair of single-sided disks in a gap merge orientation.

FIG. 10 is a cross-section of a pair of single-sided disks in a spacer merge orientation.

FIG. 19 is an exploded front view of the demerge tool of FIG. 17, prior to demerging a pair of contact merge disks.

FIG. 20 is an exploded front view of the demerge tool of FIG. 17, showing a pair of disks in a demerged state.

FIG. 38 is a side elevation view of second embodiments of a demerge tool.

FIG. 39 is a side elevation view of a pair of demerged disks or substrate disks engaged by a mandrel.

It should be understood that the drawings are not necessarily to scale. In certain instances, details which are not necessary for an understanding of the invention or which render other details difficult to perceive may have been omitted. It should be understood, of course, that the claim scope is not necessarily limited to the particular embodiments illustrated herein.

DETAILED DESCRIPTION OF THE PREFERRED EMBODIMENTS

Figure 11:
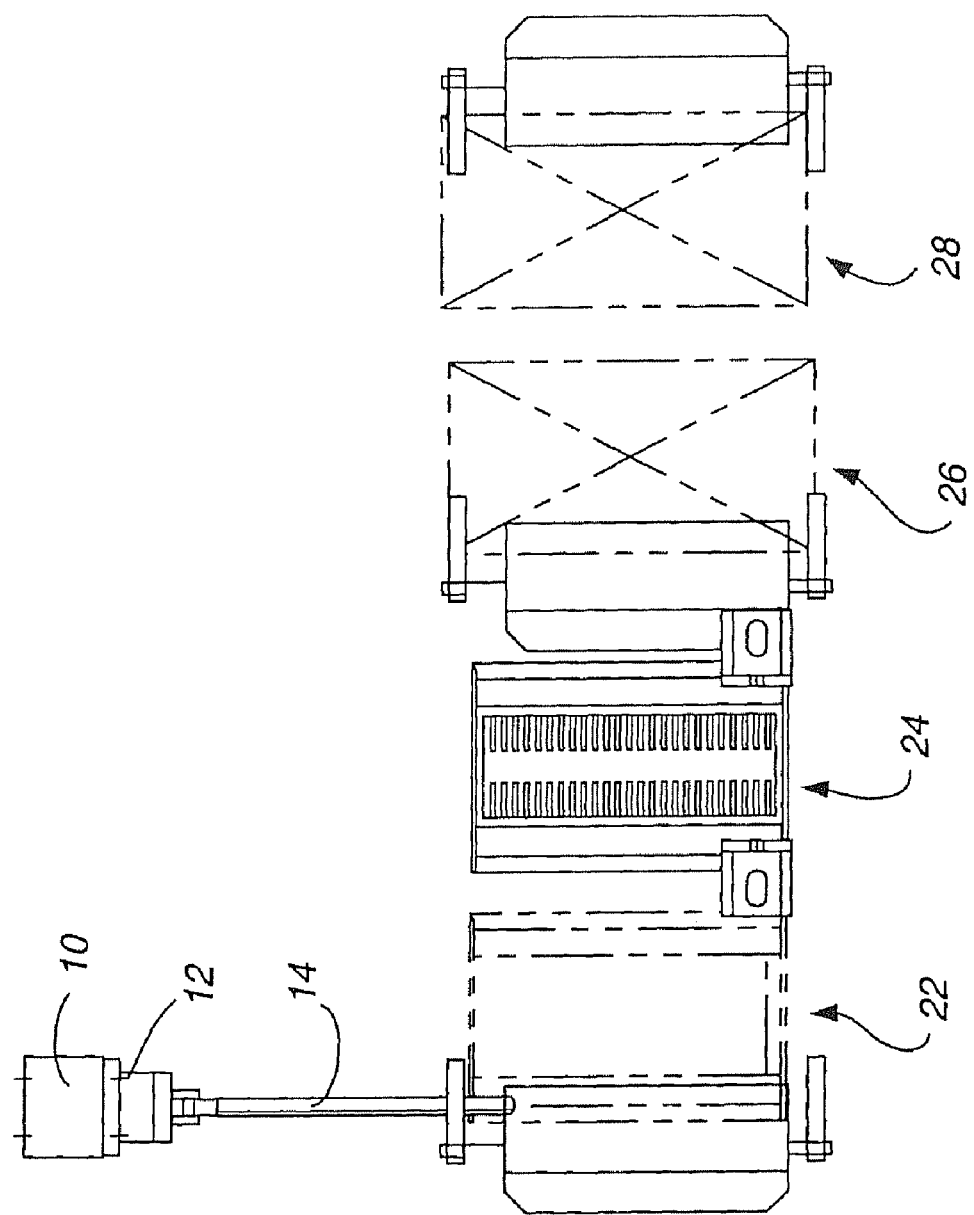
FIG. 11 is a schematic top view of a transfer station illustrating one embodiment of the present invention.
Figure 40:
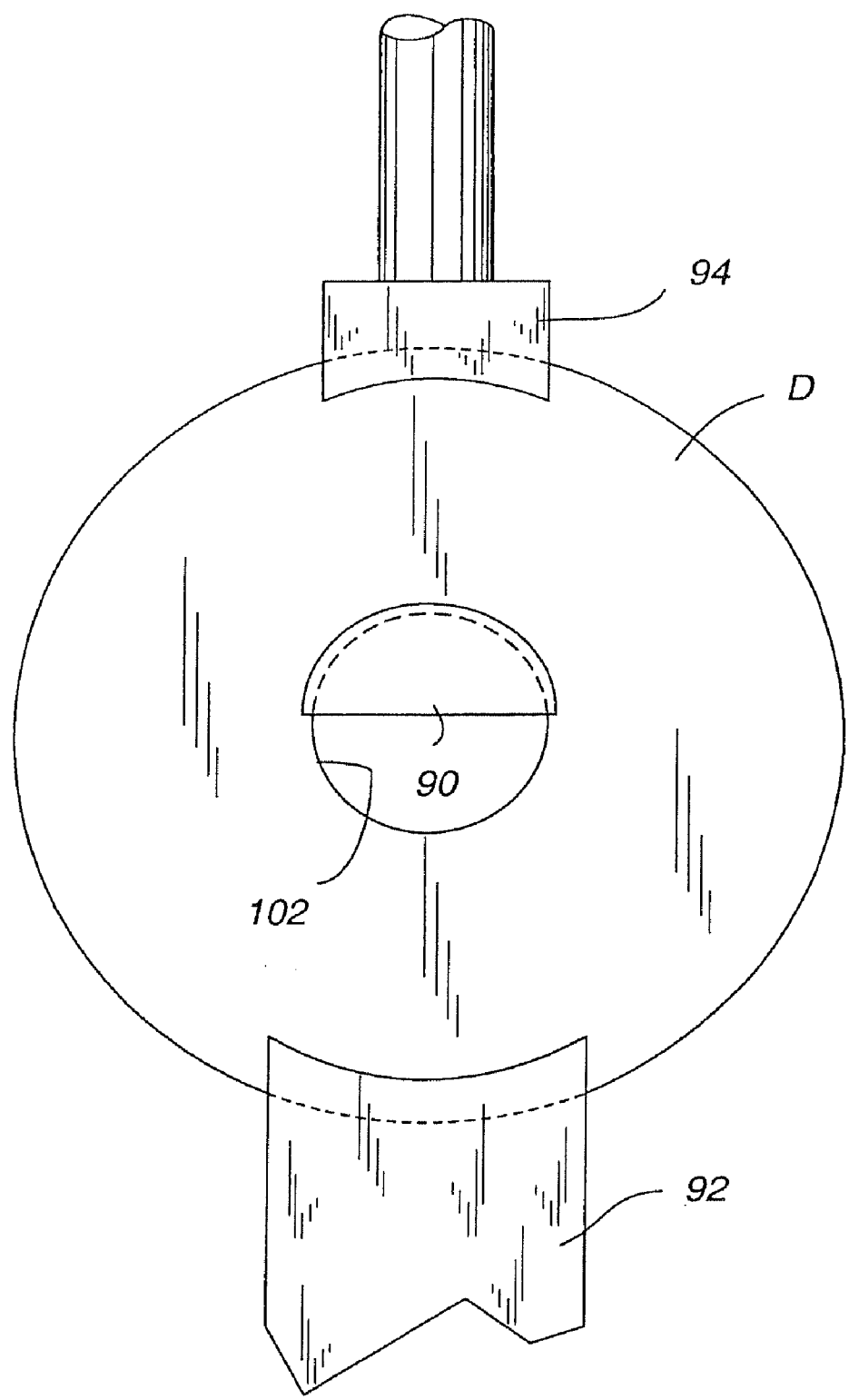
FIG. 40 is a front elevation view of the embodiments of FIG. 39.

In general terms, the apparatus or workstation for simultaneously combining or separating disk pairs is illustrated in FIG. 11. The apparatus consists of a three-axis robot 10 with a vertical arm 12 with a disk carrying mandrel 14. In one embodiment, the mandrel is configured to accommodate 25 pairs of disks (50 total). However, it should be appreciated that the number of disks can vary from one pair to as many pairs as are contained in a cassette. The mandrel may be circular in cross-section, as shown in many of the figures herein. The mandrel may also be semi-circular in cross-section as shown in FIG. 40, or it may be a two-pronged V-shape or a three-pronged shape as shown in co-pending U.S. Pat. No. 7,052,739 entitled "Method of Lubricating Multiple Magnetic Storage Disks in Close Proximity, filed May 9, 2003, the entirety of which is incorporated herein by reference as if fully stated herein, and which patent is owned by Assignee.

The apparatus also includes a load lifter 16, a transfer lifter 64, a demerge tool 20, and four disk handling stations 22, 24, 26 and 28. Station 24 is also known as the transfer station. Station 26 is also known as the R-station and station 28 is also known as the L-station. The labels R-station and L-station are in reference to the R-side and L-side of a single-sided disk. Because the cassettes position disks in a single row, the cassette at the R-station has the R-side of the disks facing forward and the cassette at the L-station has the L-side of the disks facing forward. In other words, the disks in the cassette at the R-station and L-station face in opposite directions. The reason for this will become evident upon review of the following description.

For purposes of the following description, it will be assumed that the disks are 95 millimeters in diameter and that the disks are approximately 0.050 inches thick. However, the present embodiments are not limited to use with this size disk and it is within the scope of the present embodiments to accommodate disks of different sizes.

The apparatus and process for demerging pairs of single-sided disks will be described first. Disks arrive at the demerge work station in cassettes 30. The disks will be arranged in pairs in the cassette. The pairs may be in contact merge or gap merge orientation, or they may be in some other orientation. However, the orientation of each successive disk in the cassette will alternate because the disks will have been processed in pairs, with the R-side of each disk facing outwardly of the pair (see FIGS. 8, 9). The objective is to separate the disk pairs and place them in cassettes such that their orientation is the same. This will facilitate subsequent automated handling, such as removing the disks from a cassette and placing them in disk drives. Because the disks are single-sided, it is critical that their orientation be known. Placing a single-sided disk upside down in a disk drive would result in a nonfunctional drive.

Figure 12:
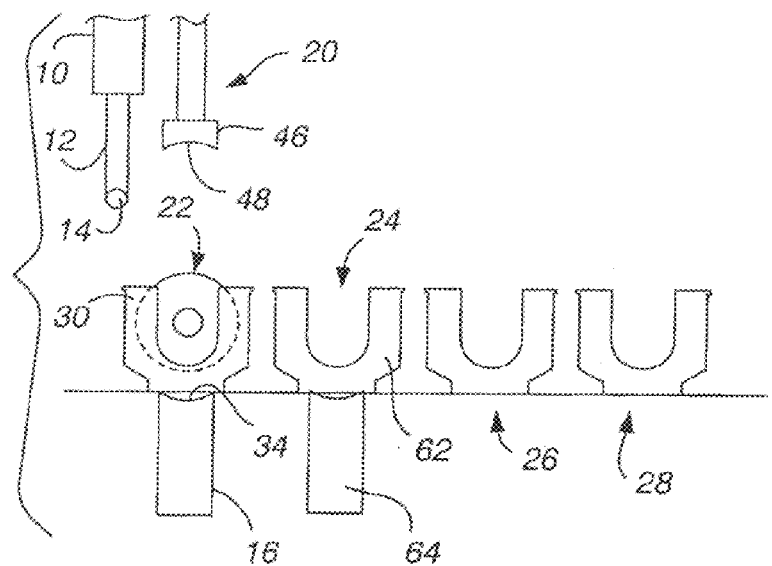
FIG. 12 is a schematic end view of embodiments of the present invention showing a cassette containing 25 pairs of contact merge disks ready for demerging.
Figure 13:
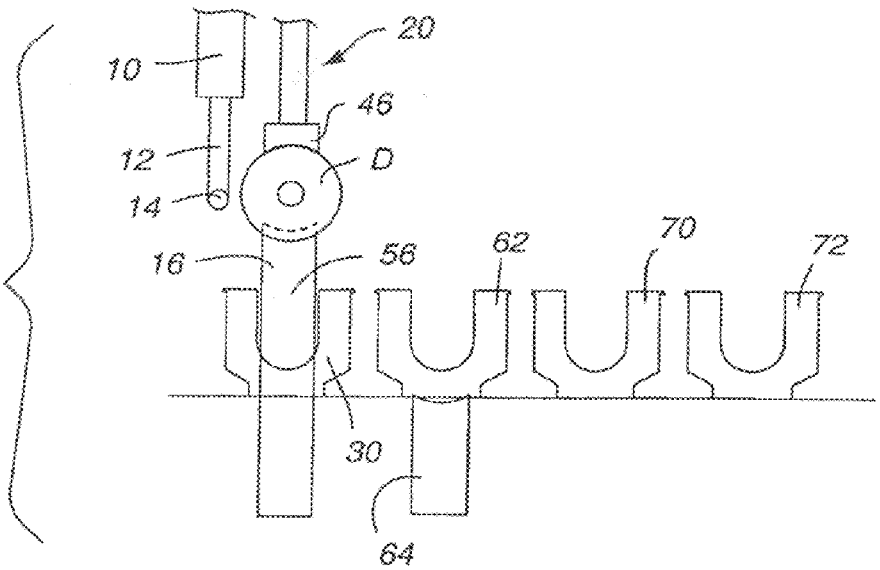
FIG. 13 is a schematic end view of the embodiment of FIG. 12 showing 25 pairs of disks engaging a demerge tool.

In some embodiments, the cassette will arrive from testing with the pairs of disks in a contact merge orientation. Separating pairs of contact merged disks is, generally, a multi-step process. Initially, as shown in FIG. 12, a cassette 30 containing pairs of contact merge disks is positioned at the load station 22. The cassette 30 contains an open bottom and open top for access to the disks, which are arranged in an aligned single row. A load lifter 16 is located underneath the load station 22. The load lifter 16 is configured to engage and accommodate all of the pairs of contact merged disks in the cassette 30. As should be appreciated, the number of disks in the cassette may vary, and the size of the cassette may vary. The present embodiments are not restricted to any particular number of disks or any particular size of cassette. In illustrative embodiments, the present apparatus utilizes cassettes that accommodate 25 pairs of disks (50 total disks), as conventional double-sided disk processing cassettes typically hold 25 double-sided disks. Preferably, each pair of disks will be positioned in a cassette within a space of approximately 0.25 inches, as one double-sided disk typically occupies the same space in a conventional double-sided disk processing cassette. Various cassette designs are disclosed and described in co-pending U.S. patent application Ser. No. 10/435,227 entitled "Cassette for Holding Disks of Multiple Form Factors" (Publication No. US-2004-0069662), filed May 9, 2003; U.S. patent application Ser. No. 10/435,360 entitled "Method of Merging Two Disks Concentrically Without Gap Between Disks" (Publication No. US-2004-0016214)), filed May 9, 2003; and, U.S. patent application Ser. No. 10/435, 161 entitled "W-Patterned Tools for Transporting/Handling Pairs of Disks" (Publication No. US-2003-0209421), filed May 9, 2003, each of which is incorporated herein by reference in its entirety as if fully stated herein. All of these applications are commonly owned by the Assignee.

Figure 14:
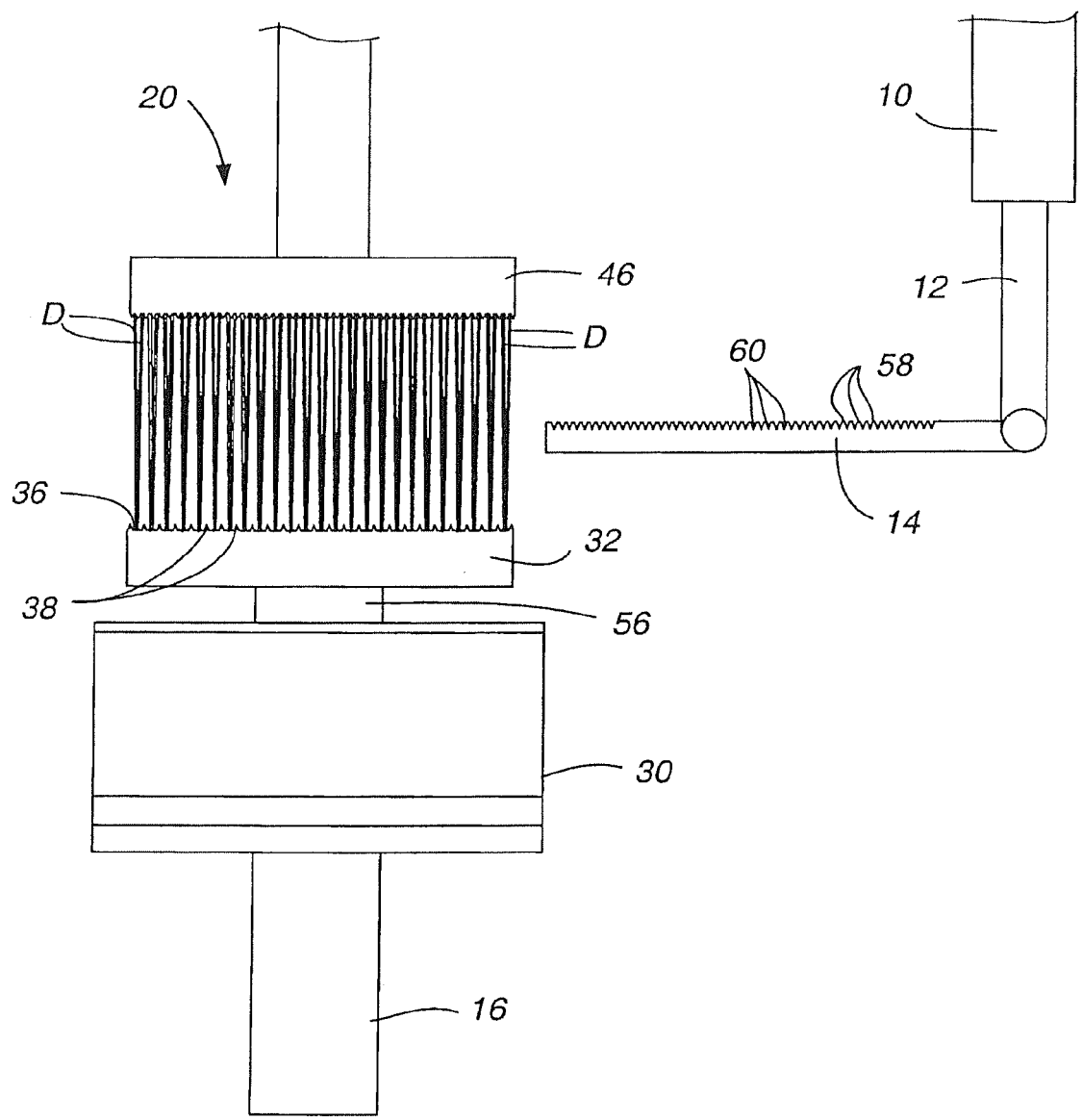
FIG. 14 is a schematic front view of the embodiment shown in FIG. 13.
Figure 15:
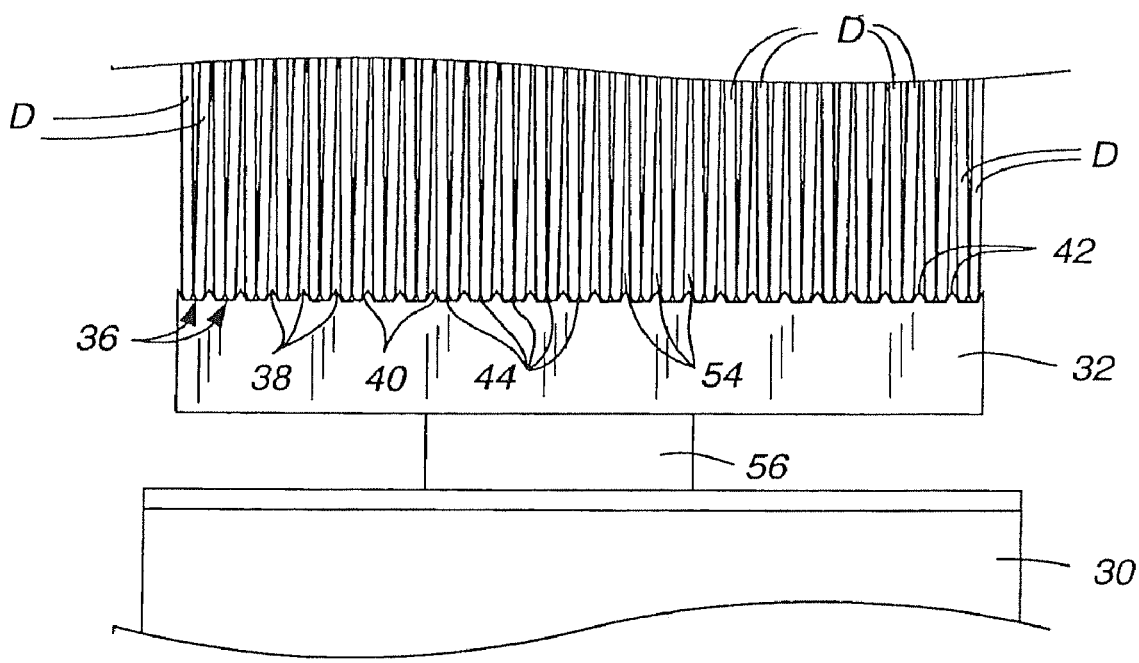
FIG. 15 is a partial front elevation of the lift saddle of the embodiment shown in FIG. 14.
Figure 16:
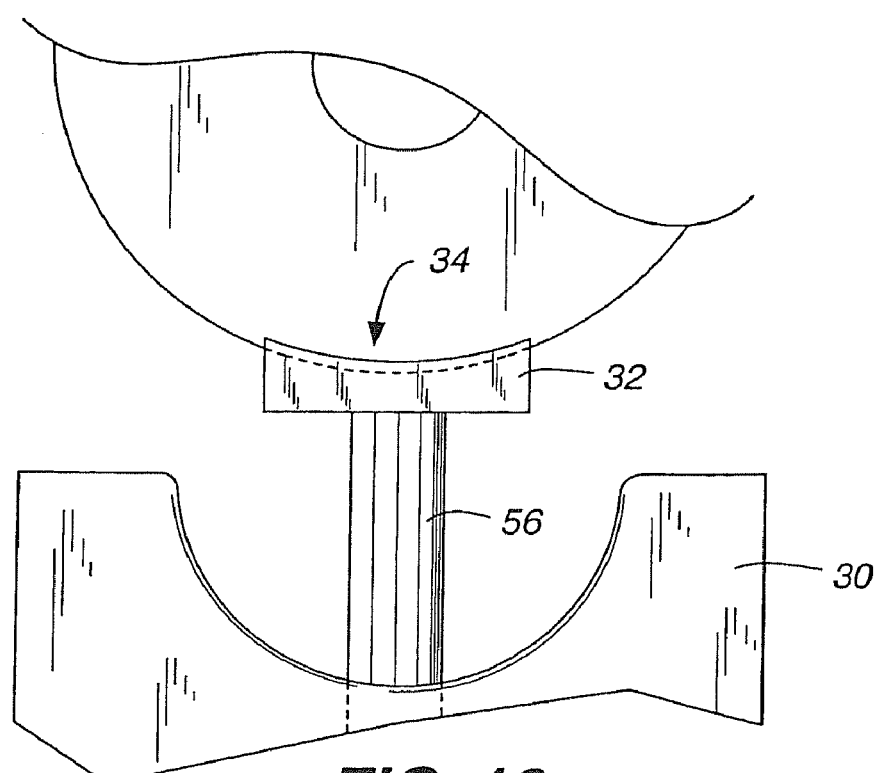
FIG. 16 is a partial end elevation of the lift saddle shown in FIG. 15.
Figure 17:
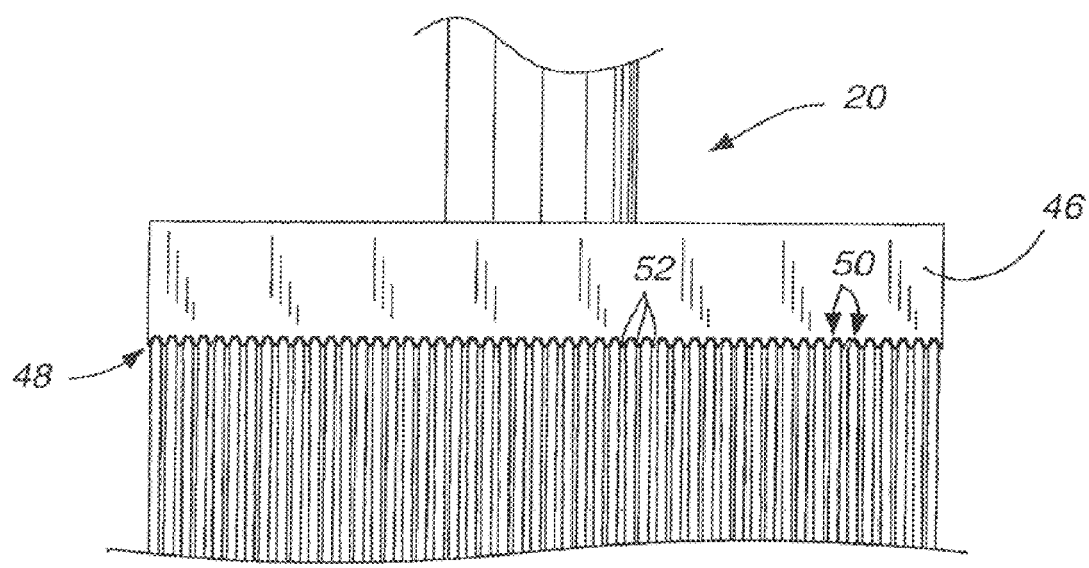
FIG. 17 is a partial front elevation view of the demerge tool of FIG. 14.

With reference to FIGS. 14-16, the load lifter 16 includes a main body portion 32 with a disk contacting surface 34. The disk contacting surface 34 is curved to correspond with the radius of the disks. The disk contacting surface 34 further includes a series of grooves or channels 36 formed by wedges or teeth 38. As the disks resident in the cassette 30 are in a contact merge orientation, the width of each groove 36 corresponds to approximately the thickness of two disks. Each groove 36 is formed between the sloped sidewalls 40 of adjacent wedges 38. The sidewalls 40 join at a top ridge 42. The distance between adjacent ridges 42 is 0.25 inches.

Figure 18:
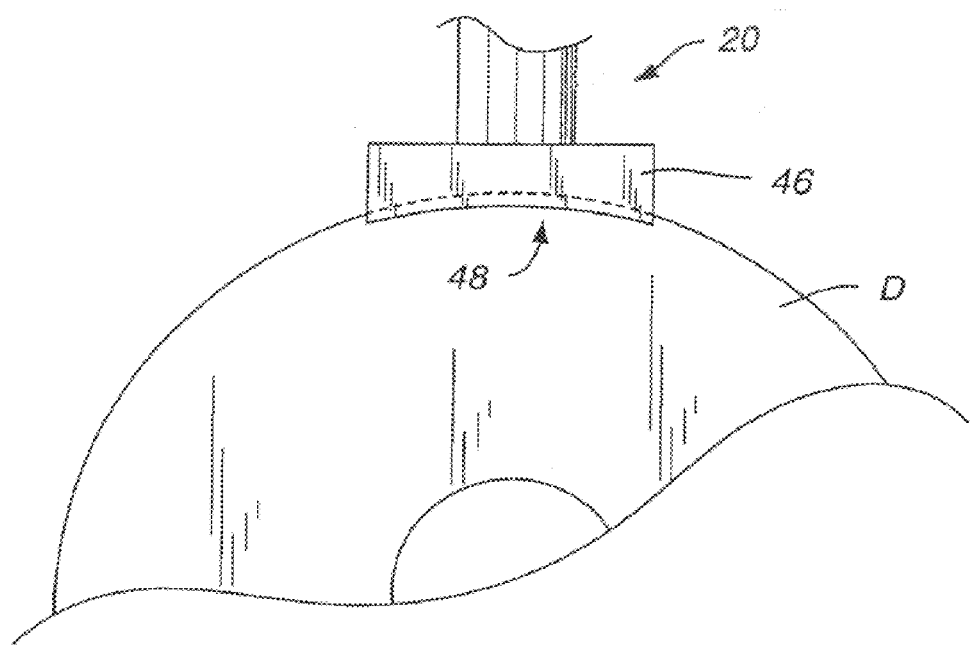
FIG. 18 is a partial end elevation view of the demerge tool of FIG. 17.

As illustrated in FIGS. 14, 15 and 18, positioned above the load station 22 is a demerge tool 20. In illustrative embodiments, the demerge tool has a main body 46 with a disk contacting surface 48 curved to correspond with the radius of the disks. The disk contacting surface 48 also includes a series of grooves or channels 50 formed by a series of triangular teeth or wedges 52. These wedges 52 are spaced in a predetermined manner to align with the interface 44 between the L-side surfaces of each pair of contact merged disks and the space 54 between each pair of disks. As can be appreciated, there are twice as many teeth 52 as teeth 38 because the demerge tool 20 places a tooth 52 between every disk and the lift saddle 16 places a tooth 38 between pairs of disks. The demerge tool 20 is positioned so that the wedges 52 align with the vertical plane defined by the L-side interface of each pair of contact merged disks.

In operation, and as shown in FIGS. 13-20, a lift rod 56 lifts the load lifter 16 while the demerge tool 20 remains stationary. As the contact merged disks are brought into contact with the wedges 52 of the demerge tool 20, the wedges 52 force the disks to separate. Since the active side (the R-side) of each disk within a pair faces outwardly of the pair, there is little chance of damaging the active surface of the disk during the demerge process. Chamferred outside perimeter edges of the disks facilitate demerge and separation of the disks.

Figure 21:
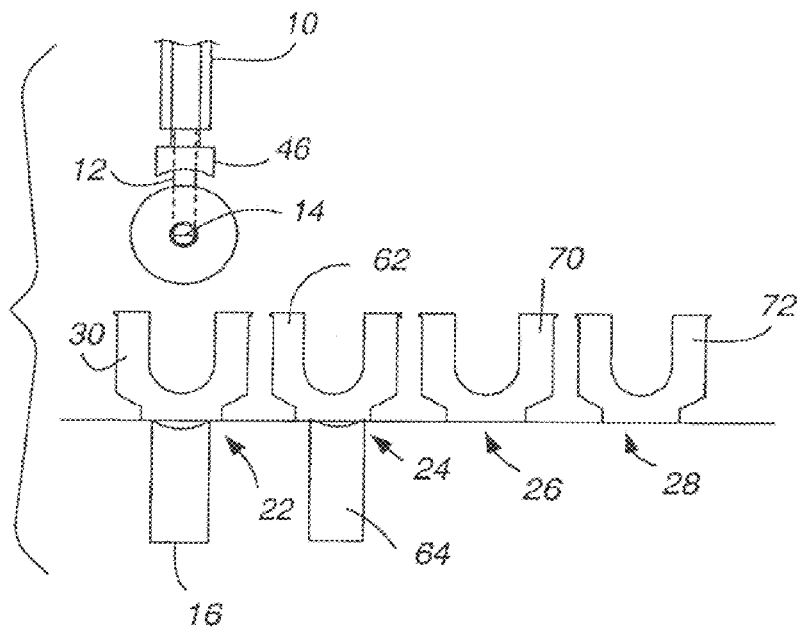
FIG. 21 is a schematic end view of the embodiment shown in FIG. 12, showing the 25 pairs of demerged disks engaged by a mandrel.
Figure 22:
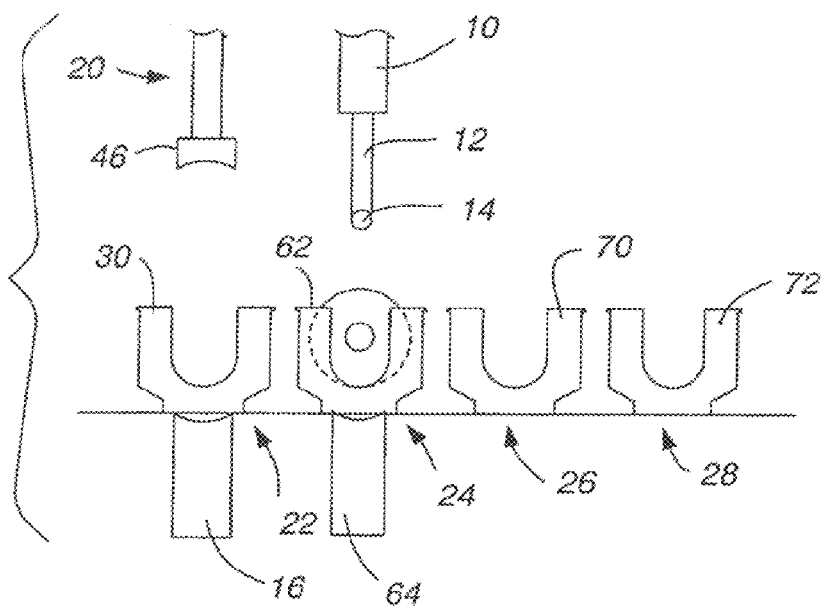
FIG. 22 is a schematic end view of the embodiment shown in FIG. 12, showing 25 pairs of disks positioned in a transfer cassette.

Next, as shown in FIG. 14, the robot 10 moves to insert the mandrel 14 through the center aperture on all disks while they are maintained between the demerge tool 20 and the load lifter 16. Due to the separation between the disks created by the demerge tool 20, as shown in FIG. 20, a gap now exists between every disk. The mandrel 14 is then raised slightly to contact the upper internal edge of the aperture. The mandrel 14 includes at least one row of teeth 58. The mandrel may have two or three rows of teeth, or may be semicircular. In illustrative embodiments, the teeth 58 are 0.125 inches apart, spaced evenly. One tooth 58 is positioned between each disk and each disk is positioned in a separate disk receiving groove 60. A more complete description of the details of a disk carrying mandrel is in U.S. Pat. No. 7,052,739 entitled "Method of Lubricating Multiple Magnetic Storage Disks in Close Proximity," filed May 9, 2003, which is incorporated herein by reference as if fully stated herein, and which application is owned by the Assignee. As seen in FIG. 21, once the disks are supported by the mandrel 14, the load lifter 16 lowers and leaves the disks suspended from the mandrel. The robot 10 then moves all disk pairs to a position above the transfer station 24 where it lowers the disks into a transfer cassette 62 (FIG. 22). The transfer cassette is configured to support the disks in an evenly spaced distribution. The robot 10 retracts from the center aperture of the disks, leaving the disks supported in the transfer cassette 62 as seen in FIG. 22.

A transfer lifter 64 is positioned beneath the transfer cassette as shown in FIG. 22. It includes a plurality of lift rods 66 with individual disk saddles 68 disposed at the top of each lift rod 66. The number of lift rods and lift saddles is equal to one-half the number of disks in the cassette. More specifically, the individual lift rods 66 and lift saddles 68 are positioned beneath every other disk in the transfer cassette 62. As previously described, the orientation of the disks alternates from one end of the cassette to the other. The first disk in the cassette has its R-side facing forward and the next disk has its L-side facing forward. Accordingly, the R-side of one half of the disk in the cassette 62 face one direction and the R-side of the other disks face in the opposite direction. Thus, the lift rods and lift saddles are positioned to engage all of the disks in the transfer cassette having the same orientation.

Figure 23:
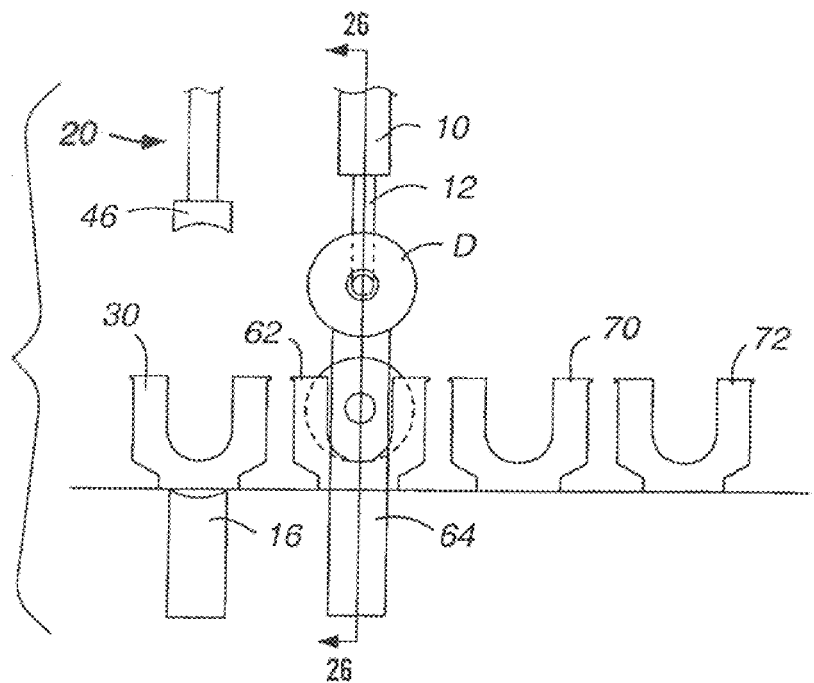
FIG. 23 is a schematic end view of the embodiment of FIG. 12, showing every other disk removed from the transfer cassette by a transfer lifter.
Figure 24:
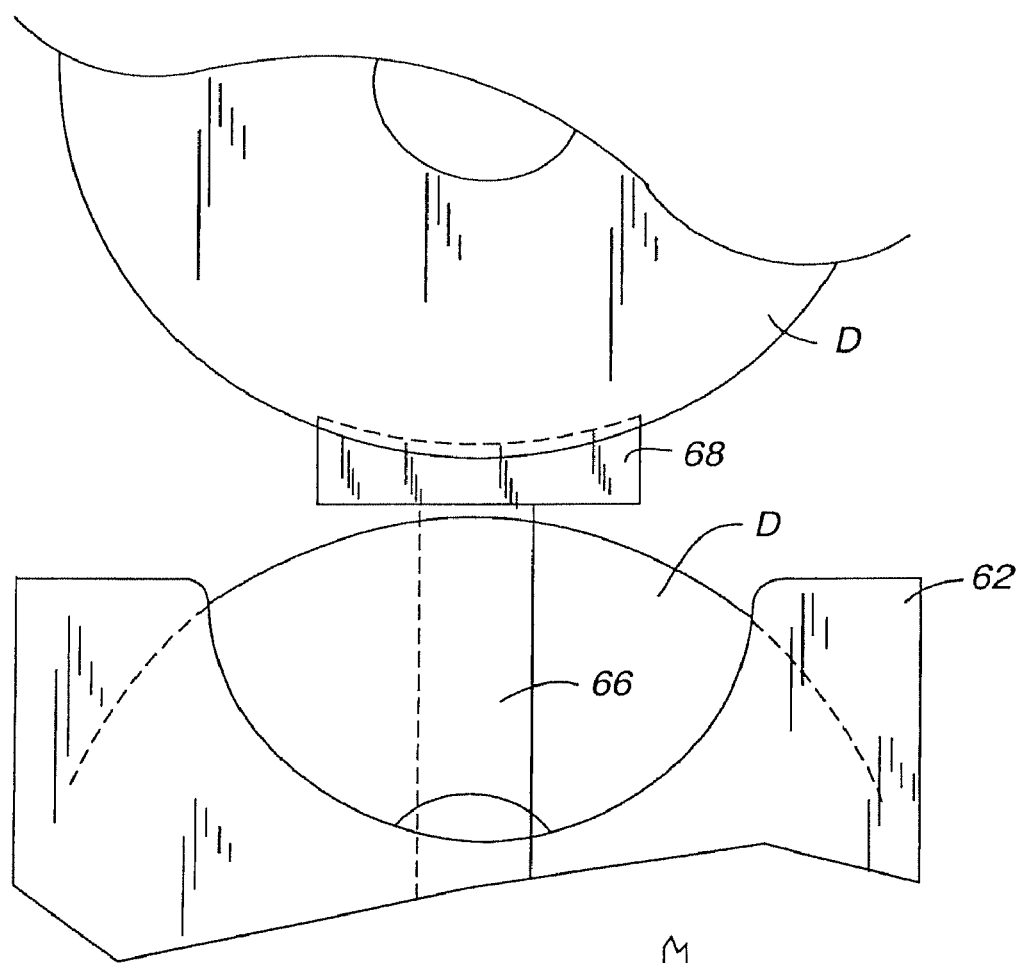
FIG. 24 is a partial end elevation of FIG. 23, showing the disks removed from the transfer assembly by the transfer lifter.
Figure 25:
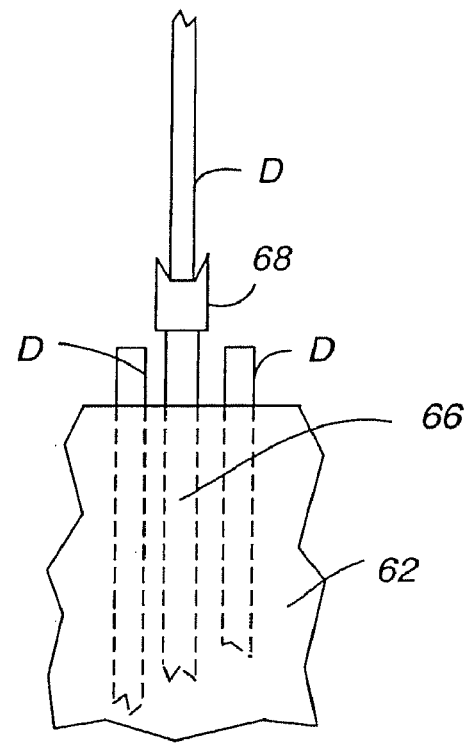
FIG. 25 is a partial front view of FIG. 24, showing one disk removed from the transfer cassette by an individual lift saddle of the transfer lifter.

At this point, the transfer lifter 64 moves upwardly and engages every other disk. The transfer lifter 64 continues its upward movement and removes every other disk. This is shown in FIGS. 23-25. Thus, all of the disks that are oriented with their R-side facing in the same direction are elevated above the cassette, leaving behind all of the disks with their R-side facing in the opposite direction. (See FIG. 26.)

Figure 27:
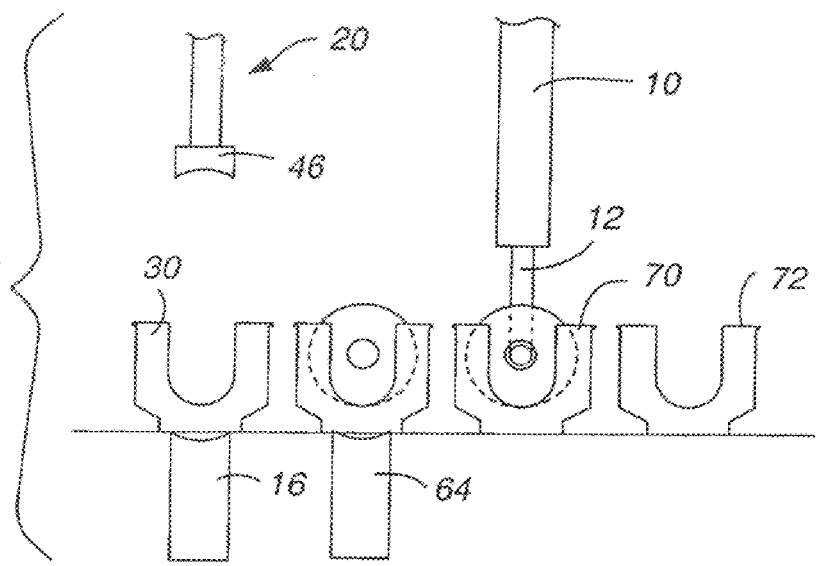
FIG. 27 is a schematic end view of the embodiment of FIG. 12, showing one-half of the disks being placed in a first cassette.
Figure 28:
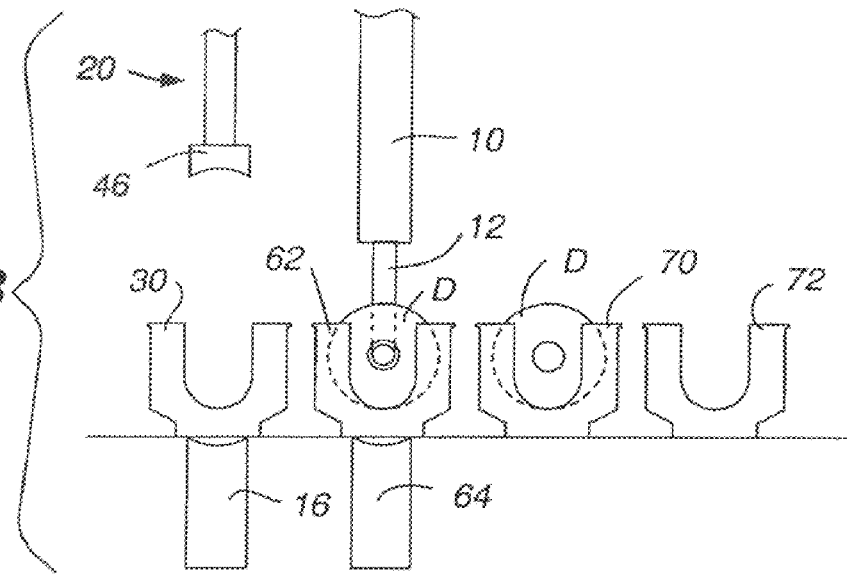
FIG. 28 is a schematic end view of the embodiment of FIG. 12, showing a mandrel engaging the remaining disks in the transfer cassette.
Figure 29:
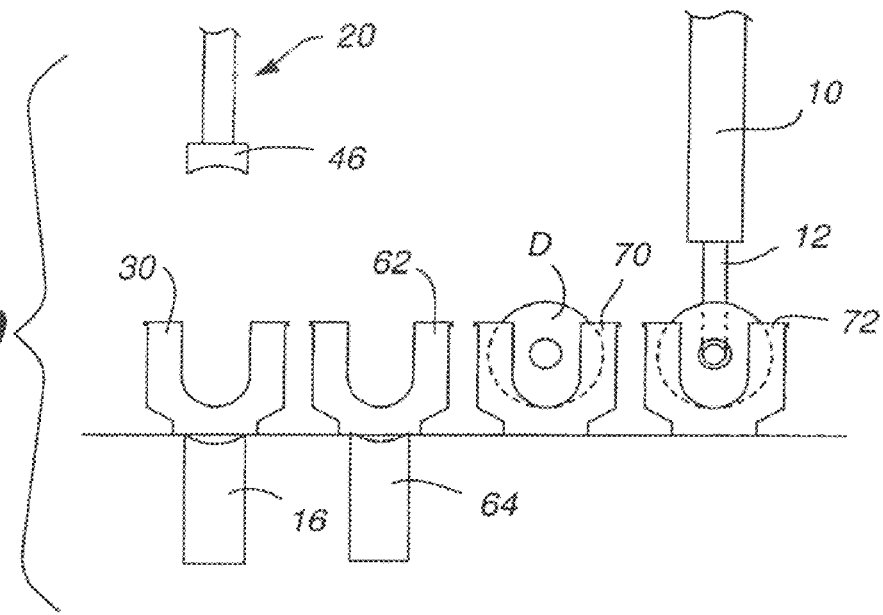
FIG. 29 is a schematic end view of the embodiment of FIG. 12, showing the remaining disks placed in a second cassette.
Figure 30:
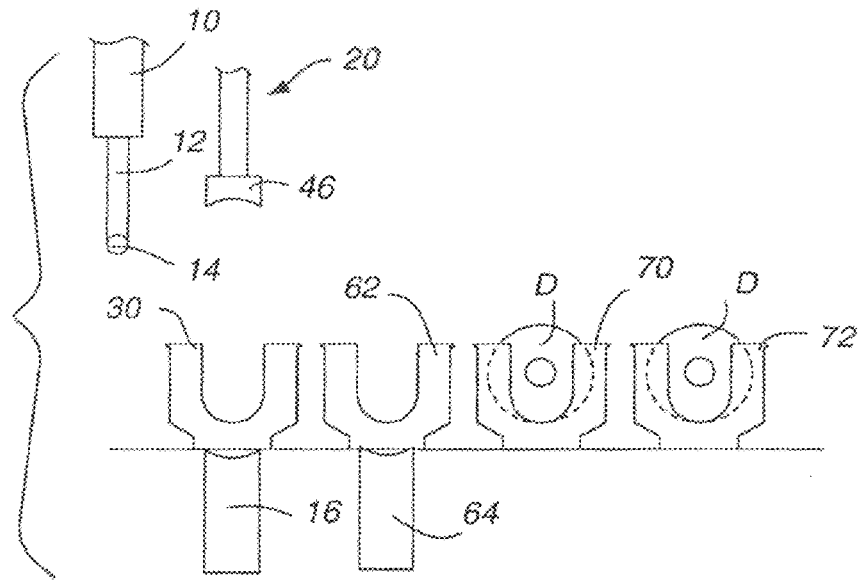
FIG. 30 is a schematic end view of the embodiment of FIG. 12, showing 25 disks aligned in one direction in the first cassette, and 25 disks aligned in the opposite direction in the second cassette; it also illustrates the first stage of second embodiments of the present invention used for merging disks or substrate disks.

With the similarly oriented disks elevated above the transfer cassette 62 by the transfer lifter 64, the robot 10 positions the mandrel 14 in the center aperture of the elevated disks to engage these disks with the mandrel 14. (See FIGS. 23, 26.) Once the disks are loaded on the mandrel 14, the transfer lifter 64 lowers to a position beneath the transfer cassette 62. The robot 10 moves to station 26 or the R-station, where a disk cassette 70 is positioned. The disks supported on the mandrel 14 are loaded in this cassette 70 (FIG. 27). The robot 10 then returns to the transfer station 24 and engages the remaining, oppositely oriented disks (FIG. 28). The robot 10 moves these disks to station 28, or the L-station, and loads these disks in a cassette 72 positioned at that location (FIG. 29). The previous pairs of contact merge disks are now separated and loaded in two separate cassettes, with the disks in each cassette oriented in the same direction, but with the disks in cassette 70 having the R-side facing forward in FIG. 29 and the disks in cassette 72 having the L-side facing forward in FIG. 29. As the cassettes are typically symmetrical, one of the cassettes can be rotated 180 degrees and the two cassettes will contain identically oriented single-sided hard disks. These cassettes 70, 72 are now available for transfer to a different station for further processing and the robot 10 returns to its base position (FIG. 30).

The demerge process can be utilized following completion of disk processing. Specifically, at the end of the manufacturing process, one cassette will contain a plurality of pairs of finished single-sided disks. As previously described, the disks may be in a contact merge orientation, although they could also be in a gap merge orientation. In any event, the disks must be reorganized such that they can be easily and effectively placed in disk drives by manual or automated means. The removal and placement of single-sided disks from a cassette into a disk drive is simplified if the disks in the cassette are similarly oriented, i.e., all the disks in the cassette have their R-side facing the same direction. Such is not the orientation when a full cassette arrives at the demerge station containing pairs of finished single-sided disks. However, at the end of the demerge operation, the disks have been placed in two cassettes 70, 72 with the R-side of every disk in the same cassette facing the same direction. These disks can more easily be loaded in disk drives without misorienting the disk in the drive.

The apparatus and method of the present embodiments may also be used for merging pairs of disks. An example would be at the beginning of the manufacturing process for single-sided disks. Typically, the first process is data zone texturing. Data zone texturing begins with a conventional, highly polished, two-sided substrate disk. Because processing has not yet commenced, the direction the substrate disks face is irrelevant; both sides of the substrate disk are the same. However, the orientation of the cassettes in the substrate disk is important. Preferably, the disks are arranged in pairs, in a gap merge orientation. However, the polishing process typically places disks in a conventional double-sided disk cassette, with 25 substrate disks in a cassette, equally spaced apart with one substrate disk every 0.25 inches. The merge process will combine two conventional cassettes of substrate disks, with a substrate disk positioned every 0.25 inch, into a single cassette with the substrate disks positioned in pairs, with the pairs in gap merge orientation. However, if preferred for other reasons, the substrate disks could be positioned in pairs in a contact merge orientation or equally spaced. The merge process requires multiple steps. The spacing and dimensions addressed below are in the context of 95 millimeter diameter disks with a thickness of approximately 0.05 inches. Spacing can vary from these dimensions.

The merge process is essentially the demerge process in reverse. The merge process begins by having two cassettes of equal number of substrate disks or disks, equally spaced, loaded at input stations 26 and 28 as shown in FIG. 30. If the cassettes 70, 72 contain virgin substrate disks, it does not matter how they are positioned at stations 26 and 28. However, if the cassettes contain partially or fully processed single-sided disks, orientation of the cassettes 70, 72 is critical. In such a case, cassettes 70 and 72 are loaded such that the orientation of the R-side of the disks face oppositely of each other. For example, the cassettes are loaded so that the orientation of the R-side (the active side) of the disks in cassette 70 at station 26 face toward the front in FIG. 30, and the R-side (the active side) for disks in cassette 72 at station 28 face toward the rear in FIG. 30. This orientation is required so that when combined, each disk pair will have their R-sides (the active surfaces) facing outward and the L-side (the inactive or nonfunctional side) facing inwardly of the pair.

Figure 26:
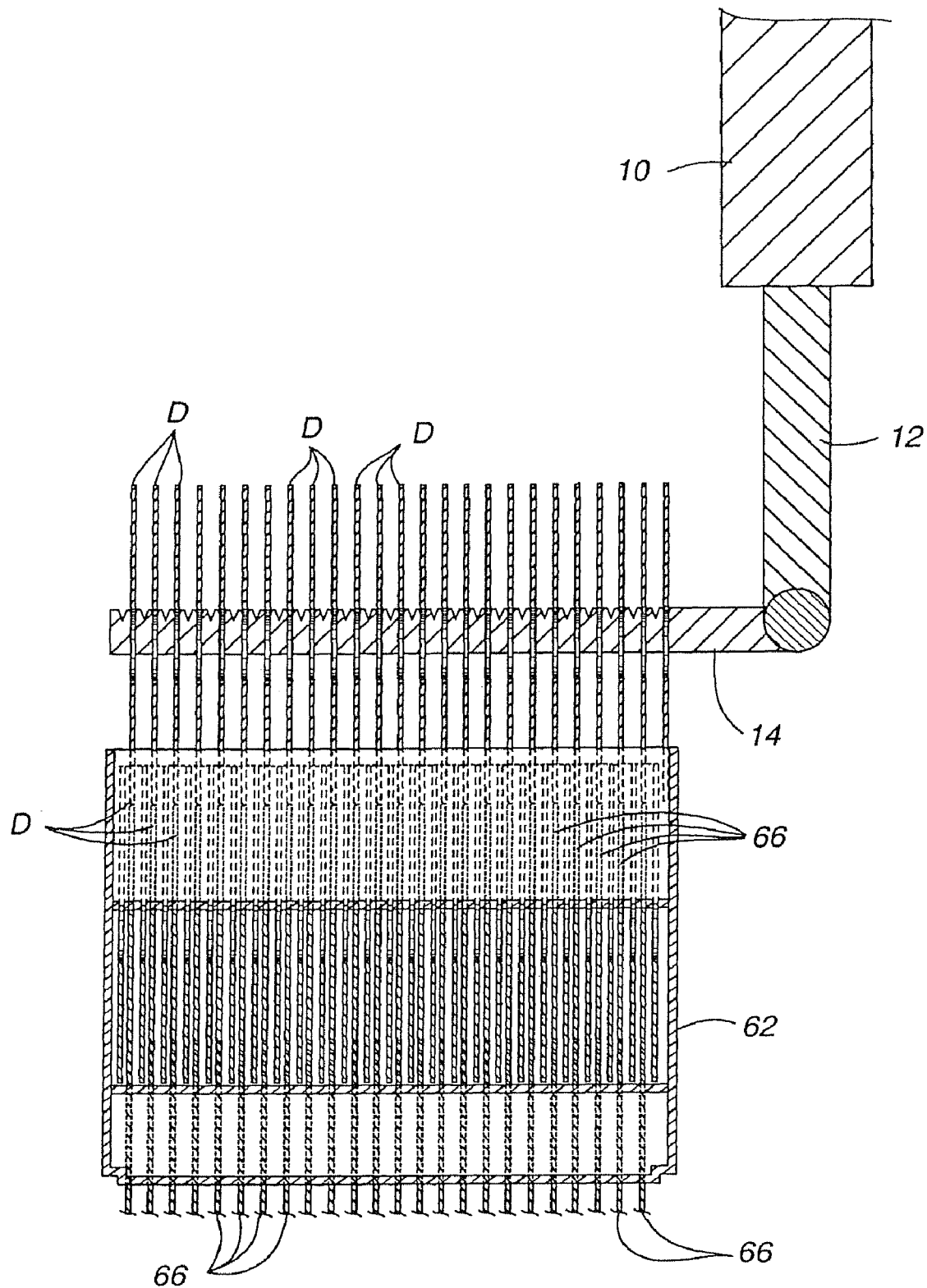
FIG. 26 is a cross-section taken along the line 26-26 of FIG. 23.
Figure 31:
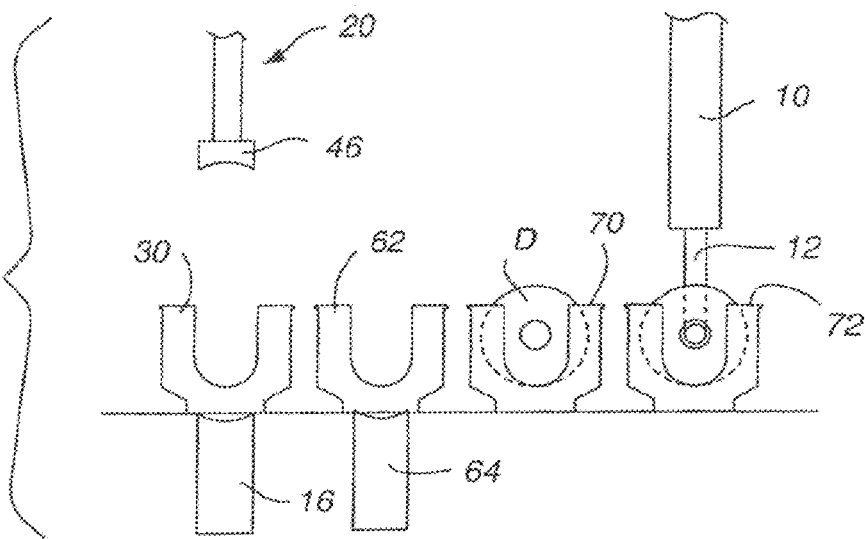
FIG. 31 is a schematic end view of the embodiments of FIG. 30, showing the disks of one cassette engaged by a mandrel.
Figure 32:
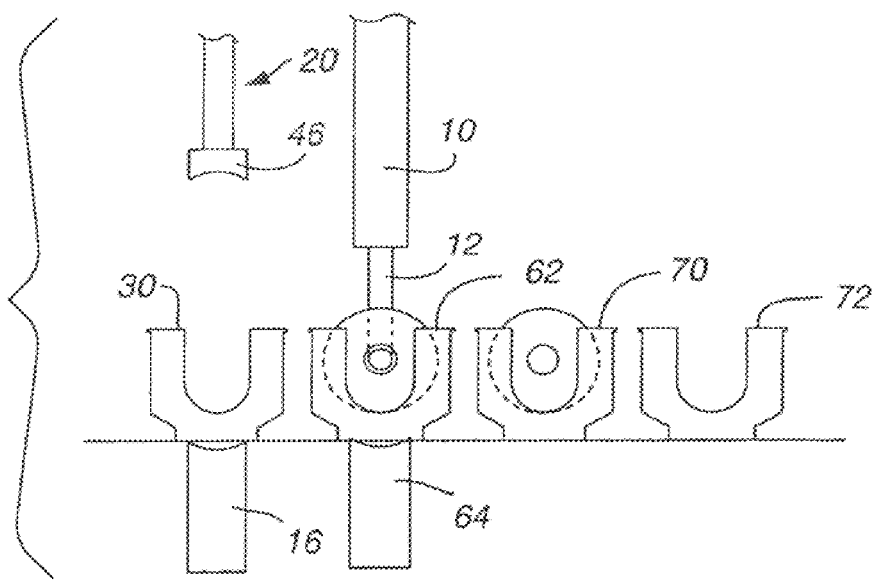
FIG. 32 is a schematic end view of the embodiments of FIG. 30, showing all of the disks from the second cassette positioned in a transfer station cassette.
Figure 33:
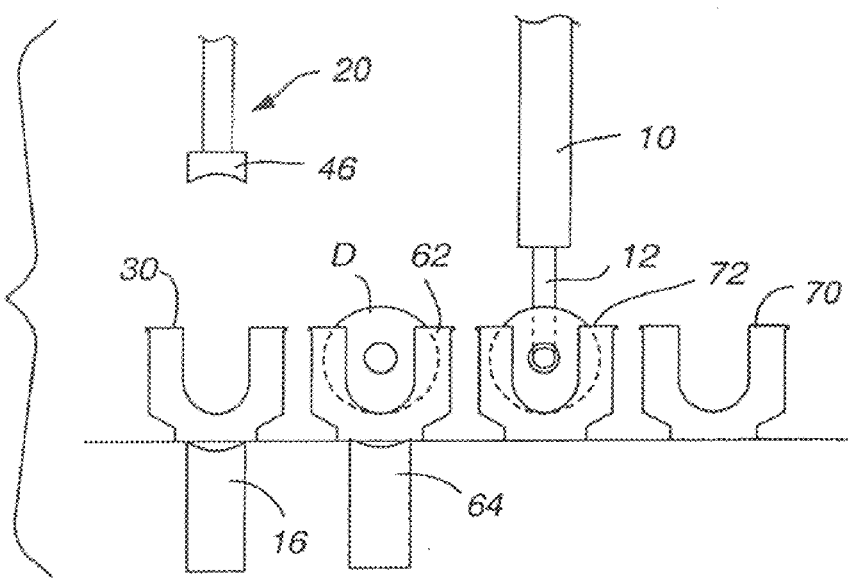
FIG. 33 is a schematic end view of the embodiments of FIG. 30, showing a mandrel engaging all of the disks in the first cassette.
Figure 34:
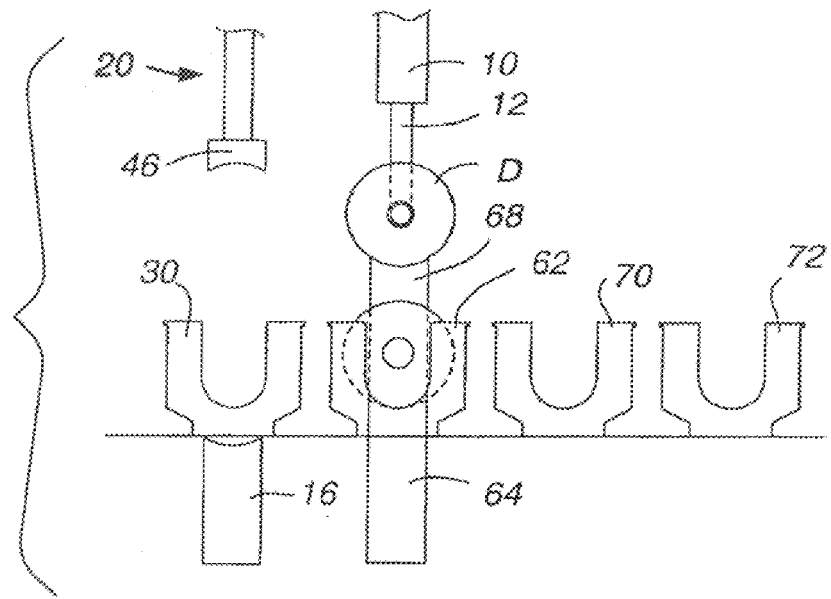
FIG. 34 is a schematic end view of the embodiments of FIG. 30, further showing the disks from the first cassette engaged by the transfer lifter.
Figure 35:
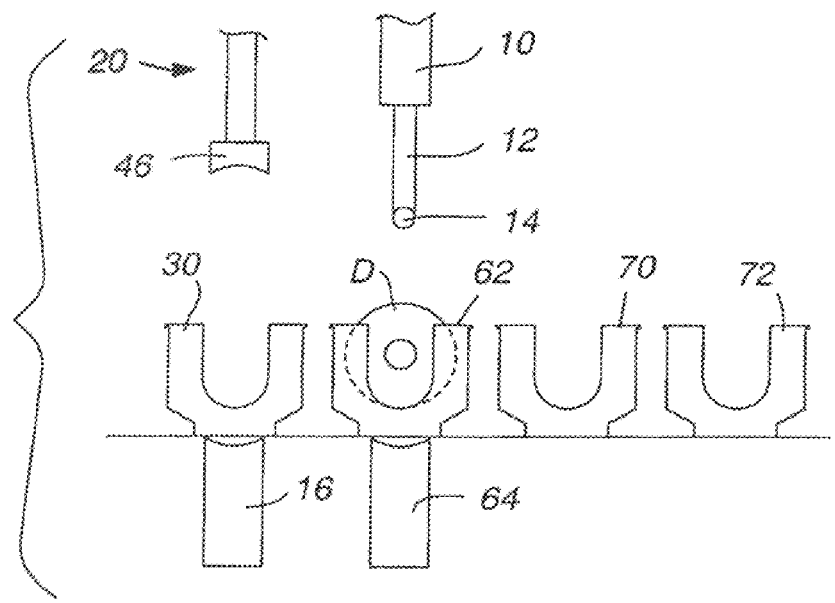
FIG. 35 is a schematic end view of the embodiments of FIG. 30, showing all of the disks from the first and second cassettes positioned in a transfer cassette.

With reference to FIG. 31, the robot 10 proceeds to station 28, inserts the mandrel 14 into the center aperture of the disks or substrate disks, engages all disks in the cassette 72 and removes them from the cassette. The robot 10 then loads these disks into the transfer cassette 62 at station 24 (FIG. 32). Next, the robot 10 will similarly engage the disks and the cassette 70 at station 26 (FIG. 33) and transport them to a position above the transfer station 24 (FIG. 34). The transfer lifter 64, positioned beneath the transfer cassette 62 at station 24, will extend to a position above the previously loaded disks at station 24, where the individual disk saddles 68 will engage the disks suspended from the mandrel 14 (FIGS. 24-26). The transfer cassette 62 is designed to space the initially loaded disks from cassette 72 with a gap of approximately 0.125 inches between disks. The individual disk saddles 68 and lifter rods 66 are designed such that the individual disk saddles 68 fit between the disks previously loaded in the transfer cassette 62. (See FIG. 25.) The saddles 68 rise up through the open top of the cassette 62, between the previously loaded disks, to their upper most limit (FIGS. 24, 25). The robot 10 then refracts the mandrel 14. The saddles 68 then lower the disks into the transfer cassette 62 at station 24 (FIG. 35). Compared to a conventional cassette 70, 72 where the substrate disks are positioned one every 0.25 inches, the transfer cassette positions two disks or substrate disks every 0.25 inches. Transfer cassette 62 now conforms twice the number of substrate disks or disks positioned in a conventional double-sided disk cassette.

Figure 36:
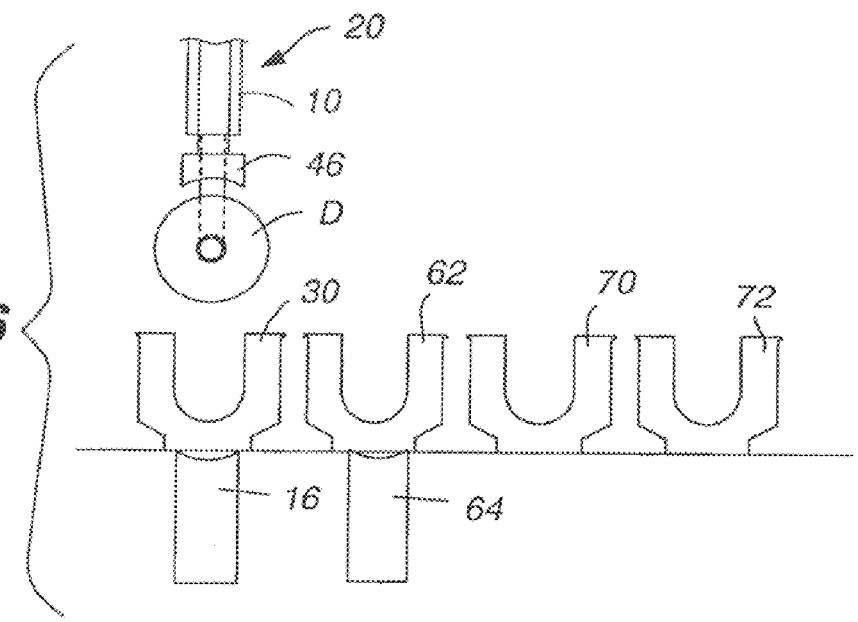
FIG. 36 is a schematic end view of the embodiments of FIG. 30, showing all of the pairs of disks from the transfer cassette engaged by a mandrel.
Figure 37:
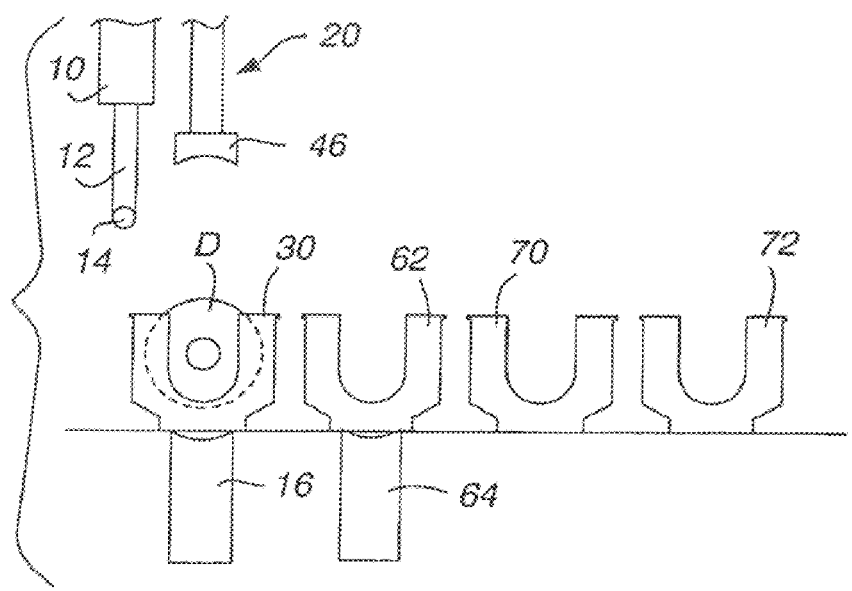
FIG. 37 is a schematic end view of the embodiments of FIG. 30, showing all of the disks from the first and second cassettes merged as disk or substrate disk pairs in a single cassette.

The robot 10 moves to the center of the transfer cassette 62. The mandrel 14 is inserted through the aperture of all disks, engages and lifts all disks. (FIG. 36.) In the preferred embodiment, all of the disks are equally spaced apart. The robot 10 moves all of the disks to station 22, and lowers the disks into a cassette 30. (FIG. 37.) If different spacing is desired, depending upon the spacing of the cassette 30 that will ultimately receive these combined disks, a mandrel 14 with differently oriented teeth 58 can be substituted.

The design of the merge cassette 30 will facilitate placement of the disks in cassette 30. The merge cassette may be configured to position the substrate disk or disks in equal spacing, or in pairs having a gap merge orientation or a contact merge orientation. If equal spacing is desired, the merge cassette 30 is configured identical to the transfer cassette 62 and the mandrel 14 makes a simple transfer from the transfer cassette to the merge cassette. If gap merge orientation is desired, the merge cassette may be configured as shown and described in co-pending U.S. patent application Ser. No. 10/435,161 entitled "W-Patterned Tools for Transporting/Handling Pairs of Disks" (Publication No. US-2003-0209421), filed May 9, 2003, which is incorporated herein by reference in its entirety as if fully stated herein, and which application is owned by the Assignee. If contact merge orientation is desired, the merge cassette may be configured as shown and described in co-pending U.S. patent application Ser. No. 10/435,360 entitled "Method of Merging Two Disks Concentrically Without Gap Between Disks" (Publication No. US-2004-0016214)), filed May 9, 2003, which is incorporated herein by reference in its entirety as if fully stated herein, and which application is owned by the Assignee. It should be understood that the embodiments described are not exhaustive of the configurations that will facilitate desired orientation of the disks in the cassette.

In further embodiments, the mandrel 90, lift saddle 92 and demerge tool 94 may be configured to manipulate fewer than all the disks in a cassette. As illustrated in FIGS. 38-40, in some embodiments the alternative design is configured to handle one pair of disks at a time, rather than an entire cassette. With reference to FIG. 38 and with respect to demerging, the lift saddle 92 lifts a pair of contact merge disks from a cassette until the upper perimeter edges of the disks engage the demerge tool. The lift saddle has a single channel or groove 96 to hold the disk pair in a contact merge orientation. The demerge tool has two channels or grooves 98, separated by a wedge 100. The wedge will create an initial separation of the disks as the lift saddle 92 raises the disk pair into contact with the demerge tool.

Once a separation has occurred between the disks, a mandrel 90 will engage the disks at the center aperture 102. The mandrel will have two grooves 104 separated by a wedge 106. The wedge will fit between the separated disks, as shown in FIG. 39, to support the disk pair and allow the lift saddle to return to its position beneath the cassette. The physical spacing created between the disks by the wedge 106 is dictated by the orientation of the cassette where the disks will be deposited. The mandrel 90 will then move the disk pair to a receiving cassette.

For merging purposes, the mandrel 96 will engage two adjacent disks in the same cassette. Again, the spacing of the two grooves and center wedge will determine the spacing of the two disks on the mandrel. The mandrel can act like a merging tool and bring two disks closer together, such as into a gap merge orientation. This spacing should match the spacing of the target cassette. In some embodiments, when working with substrate disks at the beginning of the manufacturing process, it will be desired to position the two substrate disks in a gap merge orientation. Therefore, the mandrel will merge the two disks into a gap merge orientation and then deposit them in a cassette having the same gap merge orientation. By working with two disks at a time, there is no need to use a transfer cassette.

As should be appreciated, these embodiments will operate much the same way as the embodiments shown in FIGS. 11-37, except only one disk at a time. The cassettes will need to index each time a disk pair is removed to position the next disk pair over the lift saddle 92 or over a transfer lifter (not shown). Alternatively, the lift saddle and transfer lifter can move incrementally underneath their respective cassettes.

It should be appreciated that some embodiments of the present invention are intended to accommodate 25 pairs of disks, or 50 individual disks, allowing the cassettes to be of the same size as conventional cassettes used in conventional double-side disk processing. It should be appreciated that the present embodiments will work with any number of disks. Similarly, the diameter of the disks may vary as needed. The design concept of the present embodiments can easily be extended to cover a wide range of different disk spacing configurations for incoming and outgoing cassettes and the number of disk pairs the apparatus can handle.

The foregoing discussion has been presented for purposes of illustration and description. The foregoing is not intended to limit the embodiments to the form or forms disclosed herein. In the foregoing Detailed Description for example, various features of the claimed invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of any of the disclosed embodiments. Thus, the following claims are hereby incorporated into this Detailed Description, with each claim standing on its own as separate embodiments of the invention.

Moreover, though the description of the claimed invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A method of manufacturing disks, comprising:
    processing a plurality of merged pairs of the disks in a carrier, wherein spacings between adjacent pairs of the disks are greater than spacings between disks forming each pair;
    contactingly engaging the disks in groupings of the pairs at a first common radial position and in groupings of individual disks at a second common radial position, making the spacings between disks forming each pair greater at the second common radial position than at the first common radial position;
    aligning a mandrel with the disks; and
    supporting the disks on the mandrel in an even spacing by withdrawing the contactingly engaging step.

2. The method of claim 1 wherein the processing step is characterized by the pairs of disks being gap merged.

3. The method of claim 1 wherein the processing step is characterized by the pairs of disks being contact merged.

4. The method of claim 1 wherein the contactingly engaging step is characterized by the first and second common radial positions being diametrically opposed.

5. The method of claim 4 wherein the aligning step is characterized by receivingly engaging the mandrel within a central aperture of each of the disks.

6. The method of claim 5 wherein the aligning step is characterized by the mandrel defining supporting engagement features that are aligned with the disk surfaces defining the central apertures.

7. The method of claim 1 wherein the supporting step is characterized by simultaneously supporting on the mandrel all the disks associated with the processing step.

8. The method of claim 1 wherein the supporting step is characterized by simultaneously supporting on the mandrel less than all the disks associated with the processing step.

9. A manufacturing apparatus for handling disks disposed in merged pairs in a carrier, wherein spacings between adjacent pairs of the disks are greater than spacings between disks forming each pair, the apparatus comprising:
    a first disk contacting surface defining a first cavity that is sized to receivingly engage a selected one of the pairs of disks;
    a second disk contacting surface defining second and third cavities that are sized to receivingly engage individual disks of the selected pair of disks, wherein disks that are operably engaged in the cavities are spatially separated more adjacent the second disk contacting surface than at the first disk contacting surface.

10. The apparatus of claim 9 wherein the first and second contacting surfaces are supported by extensible members and thereby moveable between a contacting engagement mode and a clearingly disengaged mode.

11. The apparatus of claim 9 wherein the disks define central apertures, and wherein the apparatus further comprises a mandrel that is insertable in the apertures and defining supporting engagement features that are spaced to match the spacings of the inner surfaces of the disks defining the central apertures.

12. The apparatus of claim 11 wherein the mandrel defines at least 50 supporting engagement features.

13. The apparatus of claim 11 wherein the mandrel defines fewer than 50 supporting engagement features.

14. The apparatus of claim 9 wherein the first cavity is sized to receivingly engage the selected pair of disks in a gap merge configuration.

15. The apparatus of claim 9 wherein the first cavity is sized to receivingly engage the selected pair of disks in a contact merge configuration.

16. The apparatus of claim 10 wherein the extensible members are diametrically opposed.

* * * * *